Fig. 1

June 1, 1965  L. BARISCH  3,186,081
METHOD OF ASSEMBLING A TRANSMISSION
Original Filed July 11, 1960  6 Sheets-Sheet 2

Inventor
Leonhard Barisch
by Michael S. Striker
Attorney

June 1, 1965  L. BARISCH  3,186,081
METHOD OF ASSEMBLING A TRANSMISSION
Original Filed July 11, 1960  6 Sheets-Sheet 5

FIG. 6

INVENTOR
Leonhard Barisch
BY
Michael J. Striker
ATTORNEY

June 1, 1965 L. BARISCH 3,186,081
METHOD OF ASSEMBLING A TRANSMISSION
Original Filed July 11, 1960 6 Sheets-Sheet 6

FIG 7

INVENTOR
Leonhard Barisch
BY
Michael J. Striker
ATTORNEY

United States Patent Office 3,186,081
Patented June 1, 1965

3,186,081
METHOD OF ASSEMBLING A TRANSMISSION
Leonhard Barisch, Ludwigsburg, Wurttemberg, Germany, assignor to Getrag Getriebe- und Zahnradfabrik G.m.b.H., Ludwigsburg, Wurttemberg, Germany
Original application July 11, 1960, Ser. No. 41,845. Divided and this application Apr. 3, 1962, Ser. No. 184,707
Claims priority, application Germany, July 10, 1959, G 27,485
6 Claims. (Cl. 29—434)

This application is a division of my copending application Serial No. 41,845, filed July 11, 1960, entitled, "Synchronism Transmission and Method of Assembling the Same."

The present invention relates to a method of assembling constant-mesh transmissions for automotive vehicles and the like, and more particularly to a method of assembling constant-mesh transmissions of the type known as synchromesh transmissions which allow for a selection of gears without clashing by synchronizing the speeds of mating gears before they come into actual engagement with each other.

As is well known in the art of transmissions, the input shaft and the coaxial main shaft of a synchromesh transmission are mounted in the transmission case and, when the shift is made to fourth (i.e., direct) speed, the shifter mechanism brings about a direct driving connection between the input shaft and the main shaft so that these shafts then rotate at identical speeds. The transmission case is formed with an open upper end which is sealable by the control cover, the latter receiving the shifter mechanism and secured to the open end of the transmission case by a series of screw bolts or the like.

An object of the present invention is to provide an improved method of rapidly and conveniently assembling the parts contained in the case of a synchromesh transmission.

Another object of the invention is to provide a method of the just outlined characteristics according to which the parts contained in the case of a fully assembled synchromesh transmission may be partially assembled externally of the transmission case to form a small number of units or groups which are thereupon placed into the transmission case and rapidly connected with each other to form a fully assembled synchromesh transmission.

A further object of the invention is to provide a time saving and very economical method of assembling the parts constituting a synchromesh transmission for automotive vehicles and the like according to which the parts mounted on the countershaft and on the main shaft may be inserted into the transmission case in fully assembled condition.

With the above objects in view, the invention resides in the provision of a method of assembling the parts in the case of a synchromesh transmission according to which all gears normally mounted on the countershaft are assembled with the countershaft externally of the transmission case and the countershaft with all gears already mounted thereon is thereupon inserted into the transmission case as a unit, followed by a second unit consisting of the main shaft and of all parts normally mounted thereon, while the input shaft is inserted only in a substantially step, i.e., after the countershaft and the main shaft are already in place. This is made possible by mounting the main drive gear (which constitutes a component of and cooperates with the third speed synchromesh clutch) on the main shaft while the latter is assembled with its parts externally of the transmission case, and by transferring the main drive gear onto the input shaft after the latter is already inserted in the transmission case subsequent to insertion of the fully assembled main shaft. In other words, the main drive gear is axially shiftable on the rear end of the input shaft and may be moved off this rear end in a direction toward and onto the forward end of the main shaft, or vice versa.

The advantages of my method reside in substantial savings in time as well as in considerable simplification of the countershaft and of the main shaft because all parts normally carried by these shafts may be assembled externally of the transmission case so that expensive splines may be replaced by simple wedges or keys in addition to the fact that the assembling of gears, guide bushes, retaining rings, clutch members, sleeves and like parts is much faster and more convenient if carried out externally of the transmission case.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figure 1:
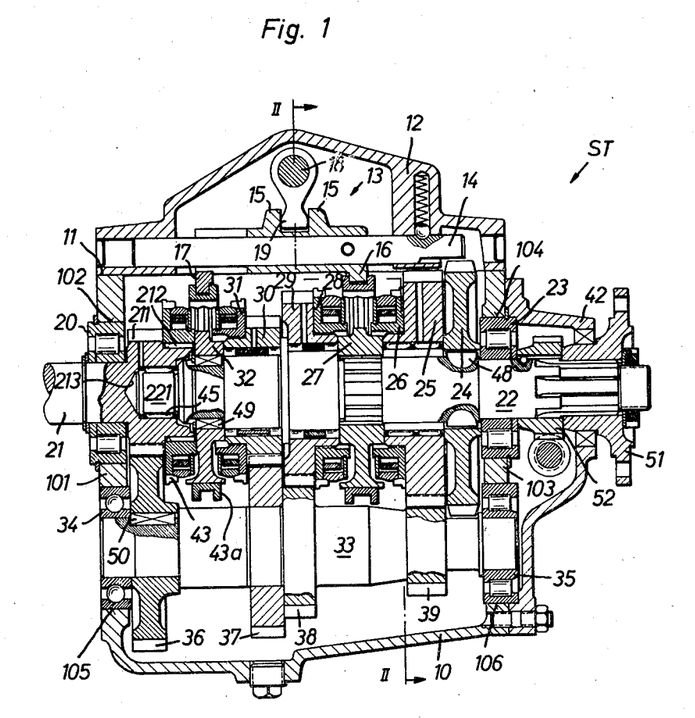
FIG. 1 is an axial section through a synchromesh transmission which is constructed and assembled in accordance with my invention, the section of FIG. 1 being taken along the line I—I of FIG. 2 as seen in the direction of arrows.

Referring now in greater detail to the drawings, and first to FIG. 1, there is shown a fully assembled synchromesh transmission ST whose basic components include a transmission case 10 formed with an open upper end 11, a control cover 12 which is secured to the case 10 and seals the open end 11, a shifter mechanism 13 which is housed in the control cover 12, and the various shafts, clutches, gears and bearings received in the transmission case 10. I will now describe in some detail certain parts in the transmission case 10 with the understanding that, except where specifically stated, these parts cooperate in a manner well known in the art and therefore are not described in full detail because such detailed description of well known elements would only obscure the true nature and scope of my invention.

The synchromesh transmission ST has four forward speeds. The shifter mechanism 13 comprises three shifter shafts 14, 141, 142 (see FIG. 2) which are axially shiftably mounted in the control cover 12 and carry customary shifter lugs 15, the latter connected to or integral with a pair of shifter forks 16 and 17. The shafts 14, 141, 142 are shiftable by a control lever 18 which carries a series of suitable cams 19 adapted to engage with the lugs 15 in a manner well known in the art. The front end wall 101 of the transmission case 10 is formed with a bore 102 for the input shaft bearing 20 which rotatably receives the input shaft 21. This input shaft is coaxial with a main shaft 22 which is rotatable in a so-called main shaft rear bearing 23 received in a bore 104 formed in the rear end wall 103 of the transmission case 10. The main shaft 22 supports a reverse speed gear 24, a first speed gear 25, a first speed clutch 26, a guide bush 27 for the first and second speeds, a second speed clutch 28, a second speed gear 29, a third speed gear 30, a third speed synchromesh clutch 31 which is adjacent to the rear end of the input shaft 21, and a guide bush 32 for the third speed.

The countershaft 33 is mounted in the bottom portion of the transmission case 10 and is rotatably received in a countershaft front bearing 34 and in a countershaft rear bearing 35. These bearings are respectively received in bores 105, 106 provided in the end walls 101, 103, respectively. The countersahft 33 supports a countershaft drive gear 36 which meshes with an integral toothed portion or gear 211 of the input shaft 21, a countershaft third speed gear 37 which meshes with the third speed gear 30, a countershaft second speed gear 38 which meshes with the second speed gear 29, and a countershaft first speed gear 39 which mates with the first speed gear 25. The reverse gear 40, shown in FIGS. 2 and 3, is mounted on a shaft 41 in the bottom portion of the transmission case 10 and is adapted to mate with the reverse speed gear 24 on the main shaft 22.

In accordance with the method of my invention, the synchromesh transmission ST is assembled as follows:

It is assumed that the rear cap 42 is detached from the transmission case 10, that the upper end 11 of the transmission case is exposed, i.e., the control cover 12 with the shifter mechanism 13 is separated from the transmission case, and that the bearings 20, 23, 34 and 35 are not as yet mounted in the bores 102, 104, 105 and 106, respectively. In accordance with my invention, and contrary to the conventional construction of synchromesh transmissions, the main drive gear 43 which cooperates with the sliding sleeve 43a of the synchromesh clutch between the shafts 21, 22 is axially shiftably connectable for rotation with the rear or right-hand end of the input shaft 21. To that end, the main drive gear or clutch component 43 is formed with internal axially parallel teeth which mesh with external axially parallel teeth 212 provided at the rear or right-hand end of the input shaft 21. The advantages of such mounting of the main drive gear or clutch component 43 will be fully pointed out hereinbelow.

Figure 2:
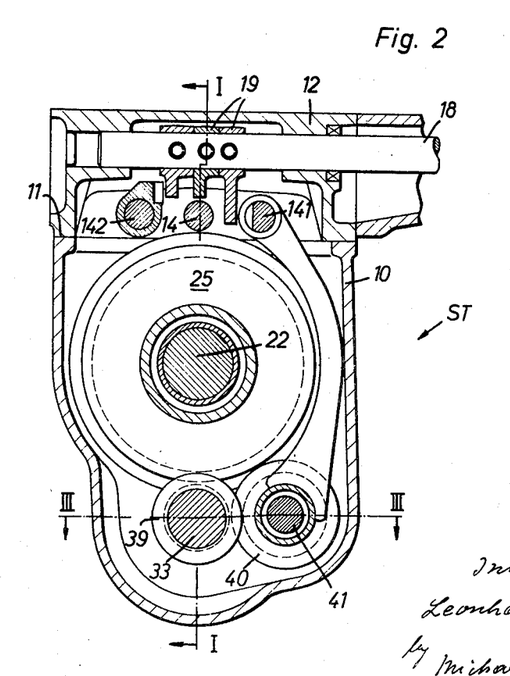
FIG. 2 is a transverse section through the synchromesh transmission as seen in the direction of arrows from the line II—II of FIG. 1.
Figure 3:
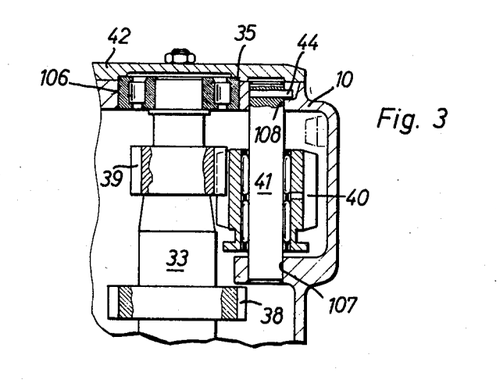
FIG. 3 is a fragmentary transverse section taken along the line III—III of FIG. 2, as seen in the direction of arrows.

In the first step, the reverse gear 40 is mounted in the transmission case 10 in a manner as shown in FIGS. 2 and 3, i.e., the shaft 41 is inserted in aligned bores 107, 108 formed in the case 10 by sliding in upward direction, as viewed in FIG. 3, to be thereupon retained in such position by a transverse lock pin 44.

Figure 6:
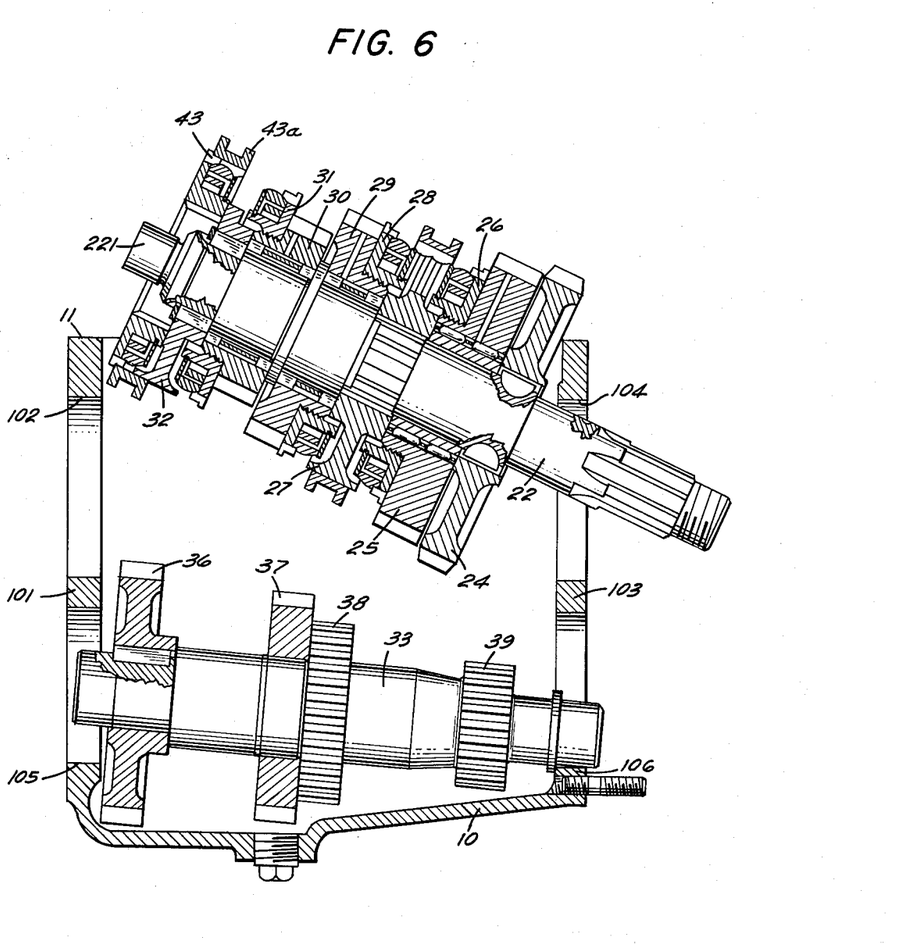
FIG. 6 is an axial section through components of a synchromesh transmission at one stage of assembly thereof in accordance with my invention.

In the next step, the countershaft 33 is fully assembled with the gears 36, 37, 38 and 39 but not with the bearings 34, 35 and is thereupon inserted into the still nearly empty transmission case 10 through the latter's open end 11. The ends of the countershaft 33 are received in the much larger bores 105, 106 so that the countershaft and the gears 36–39 come to rest in a position at a level below the position of FIG. 1, this being due to the fact that the ends of the countershaft are not as yet received in the bearings 34 and 35 as best seen in FIG. 6. Thus, the ends of this countershaft rest on the lowermost portions of walls surrounding the bores 105 and 106. The insertion of the fully assembled countershaft 33 through the open upper end 11 of the transmission case 10 may be carried out with no difficulty whatever because the input shaft 21 and the main shaft 22 are not as yet mounted in the case and because the gear 39 is sufficiently spaced from the rear or right-hand end of the countershaft so that the latter may be readily tilted during its insertion into the transmission case 10. The reasons for not immediately mounting the countershaft in its bearings 34, 35 will be readily understood by referring to FIG. 1 which shows that, when the transmission ST is fully assembled, the gears 36, 37, 38, 39 mate with the gears 211, 30, 29, 25 respectively, i.e., it would not be possible to insert the main shaft 22 and the input shaft 21 with the gears and clutch members assembled on the main shaft, as seen in FIG. 6, if the countershaft 33 would immediately assume a position as shown in FIG. 1.

In the third step, the main shaft 22 is fully assembled, also externally of the transmission case 10, and is thereupon inserted through and at an angle with respect to the open upper end 11 in such a manner that its rear or right-hand end projects, as clearly seen in FIG. 6, through the comparatively large bore 104. FIG. 6 shows that such insertion of the main shaft, with the parts 24–32 and 43 already mounted thereon, presents no difficulty because the bore 104 is rather close to the open upper end 11 and because the overall length of the main shaft only slightly exceeds the distance between the inner sides of the end walls 101, 103. As stated above, and as seen in FIG. 6, the main drive gear 43 is temporarily supported, by sleeve 43a, at the left-hand end of the main shaft 22 before the latter is inserted into the transmission case 10.

Figure 7:
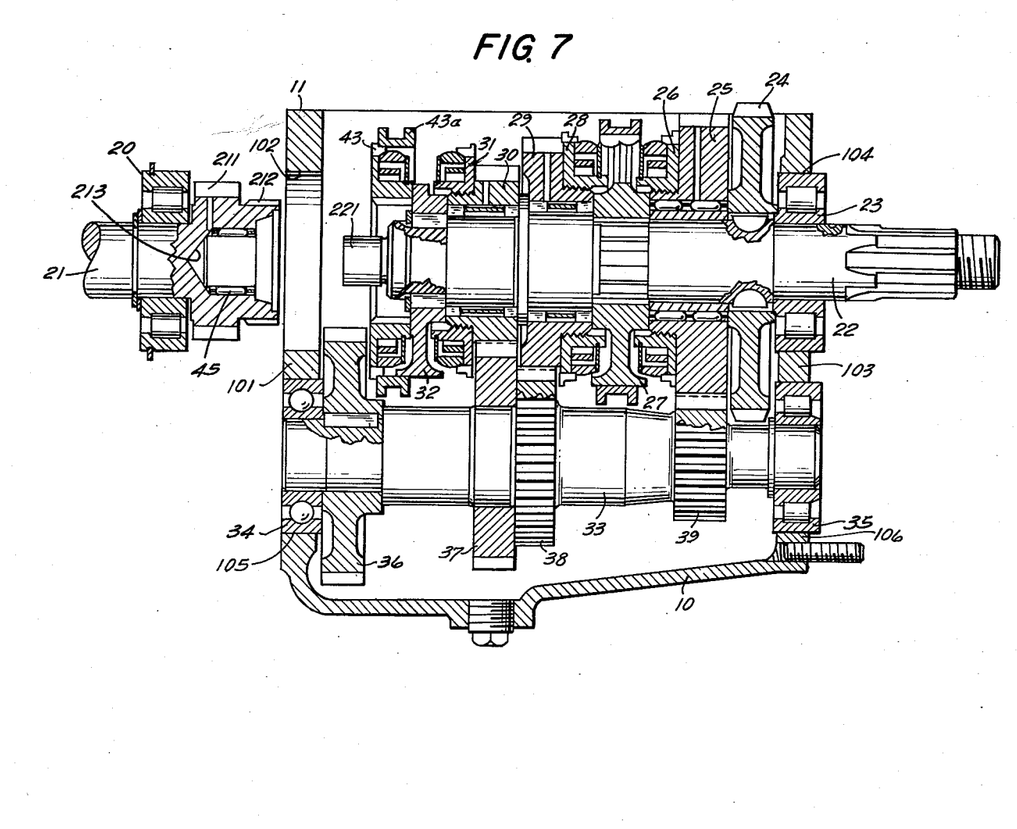
FIG. 7 is an axial section through the synchromesh transmission at another stage of assembly thereof later than that illustrated in FIG. 6.

In the next step, illustrated in FIG. 7, the input shaft 21 is inserted through the bore 102 in a direction to the right so that its externally toothed portion 212 may extend into the internally toothed bore of the main drive gear 43. It will be noted that the diameter of the gear 211 on the input shaft 21 is smaller than the diameter of the bore 102 so that the insertion of this input shaft presents no difficulty. The required driving connection between the shaft 21 and the main drive gear 43 is established as soon as the toothed portion or gear member 212 is properly received in the drive gear 43. Of course, it will be readily understood that a driving connection between the parts 21, 43 may be established in a different way, i.e., not necessarily by providing a toothed portion 212 on the shaft 21 and a mating internally toothed portion on the drive gear 43. It is important to provide means on the shaft 21 and on the main drive gear 43 for axially movably guiding the gear 43 longitudinally of the right-hand end of the shaft 21 during the assembly operation. The rear end of the input shaft 21 is formed with a blind bore 213 which receives the smaller-diameter forward end 221 of the main shaft 22. A roller- or needle bearing 45 is interposed between the input shaft 21 and the main shaft portion 221 in the bore 213.

In the next step, the operator inserts the bearings 20 and 23 into the bores 102, 104, respectively, so that the shafts 21, 22 are lifted to the position of FIG. 1. The bearings 34, 35 are inserted in the following step so that the countershaft 33 also assumes the position of FIG. 1.

In the final step, the operator connects the rear cap 42 to the transmission case 10 and applies the control cover 12 over the open end 11.

It will be seen that my improved method of assembling a synchromesh transmission renders it possible to assemble the groups of parts on the main shaft 22 and on the countershaft 33 externally of the transmission case 10 because the main drive gear 43 is axially shiftably but non-rotatably connectable with the rear end of the input shaft 21.

Figure 4:
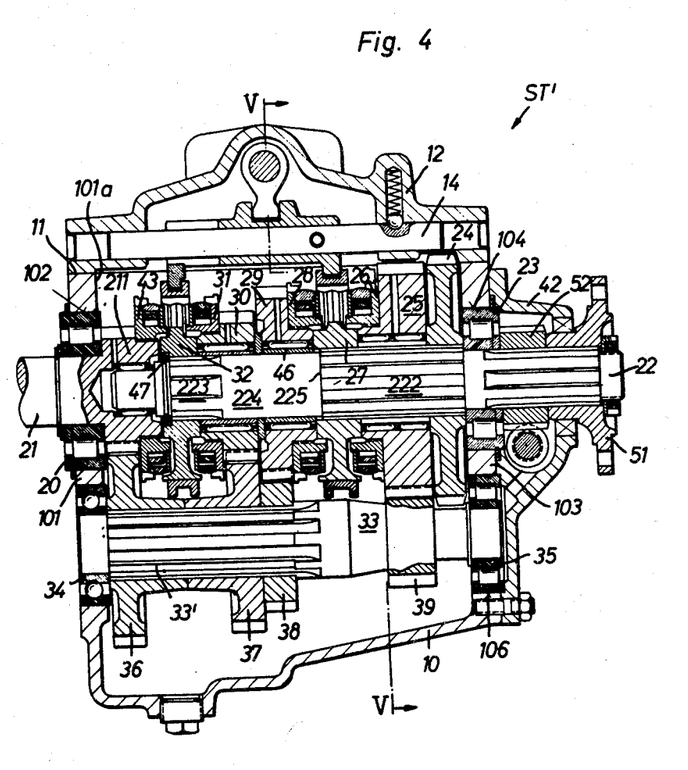
FIG. 4 is an axial section through a synchromesh transmission constructed and assembled in the manner as known before the advent of my invention, the section of FIG. 4 being taken along the line IV—IV of FIG. 5, as seen in the direction of arrows.
Figure 5:
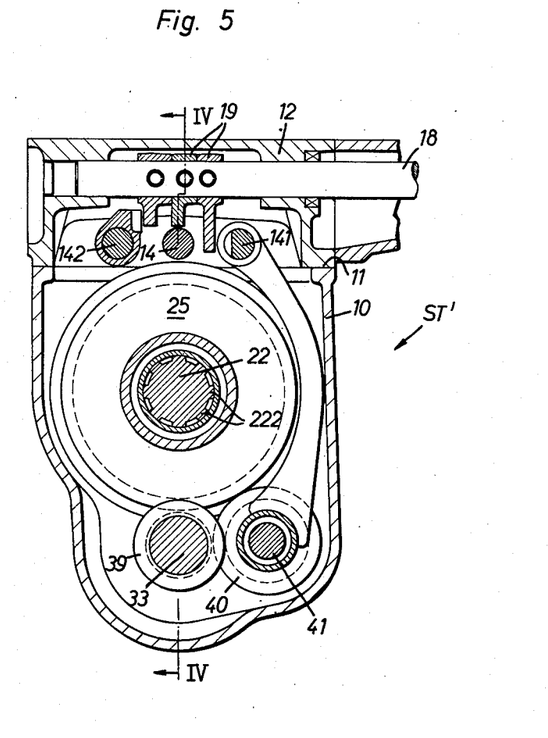
FIG. 5 is a transverse section as seen in the direction of arrows from the line V—V of FIG. 4.

For better understanding of my invention, I will now describe the conventional method of assembling a synchromesh transmission with reference to FIGS. 4 and 5 which show a structure ST' similar to the one shown in FIGS. 1 and 2 with the exception that the main drive gear 43 is not movable in the axial direction of the input shaft 21 and with certain other modifications which will be pointed out as the description of FIGS. 4 and 5 proceeds.

The first step again comprises inserting and mounting the reverse gear 40 and its shaft 41 in the manner as described above. The control cover 12 is assumed to be removed from the open end 11.

In the next step, the operator inserts the gears 36, 37 and 38 into the transmission case 10. Since the rear cap 42 is assumed to be removed, the operator is free to insert the countershaft 33 through the bore 106 of the rear end wall 103 to such an extent that the gear 39, already mounted on the countershaft, is still located externally of the transmission case, i.e. adjacent to the outer side of the rear end wall 103. It will be noted that the countershaft 33 of FIG. 4 is formed with a long splined portion 331 which is adjacent to its forward or left-hand end and whose leftmost end (shown in FIG. 4 as adjacent to the bearing 34) barely extends into the internally toothed second speed gear 38 when the gear 39 is still adjacent to the outer side of the wall 103. The gears 36 and 37 are already inserted into the case 10 but are not as yet mounted on the splined portion 331, i.e., they rest on the bottom wall of the transmission case. Such partial insertion of the countershaft 33 without the gear 36, 37 thereon renders it possible to insert the input shaft 21 in the next assembling step. The input shaft 21 is inserted through the open end 11 because it is already rigidly connected with the main drive gear 43 whose diameter is larger than the diameter of the bore 102 in the front end wall 101. Therefore, it is necessary to insert the input shaft 21 through the open end 11 with the forward or left-hand end of the shaft 21 (broken away in FIG. 4) leading and guided through the bore 102 to project from the outer side of the front end wall 101. The input shaft 21 is pushed to the left to such an extent that its integral toothed portion or gear 211 extends into the bore 102 and that the main drive gear 43 abuts against the inner side 101a of the front end wall 101.

In the next step, the operator introduces the main shaft 22 in a direction to the left by passing the main shaft through the bore 104 in the rear end wall 103. The main shaft 22 is introduced in stepwise fashion and is simultaneously assembled with the parts 24–32 which are inserted through the open end 11 and are successively mounted on the main shaft in the order in which they are numbered. It will be noted that the main shaft 22 is formed with a comparatively long median splined portion 222 and with a comparatively short left-hand splined portion 223. The splines of the portion 223 are formed in a cylindrical portion 224 which extends all the way to the median splined portion 22 and whose diameter is smaller than the maximum diameter of the portion 222 so that the portions 222, 224, define a shoulder 225. Adjacent to the shoulder 225, the cylindrical portion 224 receives a bush 46 which rotatably mounts the gear 29. The bush 46 is mounted on the cylindrical portion 224 with a small axial play (see the small gap between the right-hand end of the bush 46 and the shoulder 225) which enables the operator to shift the fully assembled main shaft 22 slightly to the right through a distance equal to the axial play of the bush 46 so that a retaining ring 47 may be inserted into a suitable annular groove formed on the main shaft within the guide bush 32 so that this guide bush is held against axial movement in a direction to the left.

In the next step, the operator connects the input shaft 21 with the main shaft 22 in the well-known manner and inserts the bearings 20 and 23. In a subsequent step, the countershaft 33 is moved further to the left by simultaneously mounting the gears 37 and 36 on its splined portion 331. The bearings 34, 35 are inserted after the gears 37, 36 are in place, and the operator then completes the assembly by attaching the rear cap 42 and the control cover 12 to the transmission case 10.

The above description clearly shows that the assembling of a synchromesh transmission in the conventional manner is a lengthy and much more complicated operation. In addition, when the transmission ST is assembled in the manner described in connection with FIGS. 1 to 3, the main shaft 22 and the countershaft 33 may be finished at a lower cost because a machining of long splined portions 222, 223 and 331 may be dispensed with. Referring to FIG. 1, it will be noted that the gear 24 and the guide bush 32 may be mounted on the main shaft 22 with the help of suitable wedges or keys 48, 49, respectively, because they may be assembled with the main shaft before the latter is inserted into the transmission case 10. Thus, the bores of parts 24 and 32 need not be formed with internal teeth to mesh with the splines 222, 223, respectively, and these splines may be replaced by one or two keyways for the keys 48, 49. This holds equally true for the mounting of the gear 36 on the countershaft 33. In FIG. 1, the gear 36 is non-rotatably secured to the countershaft 33 by a key 50 whereas FIG. 4 shows that the gear 36 of a conventionally assembled synchromesh transmission ST' must be formed with internal teeth to mesh with the splines 331. Thus, the improved method results in considerable savings in time as well as in savings due to a lower manufacturing cost. All this is due to the fact that the main drive gear 43 is connectable with the input shaft 21 after the latter is inserted into the transmission case 10, i.e., the main drive gear 43 is temporarily mounted on the main shaft 22 and is transferred onto the rear end of the input shaft 21 only after the shafts 21, 22 are already received in the transmission case. As a result of such temporary mounting of the main drive gear 43 on the main shaft 22, the input shaft 21 may be inserted through the bore 102 and the countershaft 33 may be fully assembled with the gears 36–39 before an insertion of the shafts 21, 22 into the transmission case. Also, because the input shaft 21 may be inserted after the insertion of the main shaft 22, the latter may be fully assembled externally of the transmission case which brings about additional advantages as fully described hereinabove.

The companion flange 51 and the worm wheel 52 may be mounted on the main shaft 22 after the assembly of the transmission ST is completed.

Without further analysis, the foregoing will so fully reveal the gist of the present invention that others can, by applying current knowledge, readily adapt it for various applicaitons without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of assembling the counter-shaft and other parts contained in the case of a synchromesh transmission of the type in which the main drive gear is axially shiftable for mounting on and for movement off the rear end of the input shaft and wherein the case has an open upper end, a pair of coaxially aligned bores for receiving front and rear countershaft bearings, and a pair of coaxially aligned bores for receiving input shaft and main shaft bearings, respectively, said method comprising the steps of assembling the countershaft with all parts normally mounted thereon prior to insertion of the countershaft into the transmission case; inserting the countershaft through the open upper end of the transmission case in such a way that the ends of the countershaft are loosely received in the bores provided in the transmission case for the front and rear countershaft bearings, at least one of the parts mounted on the countershaft having a diameter larger than either of the bores; assembling the main shaft with all parts normally mounted thereon prior to insertion of the main shaft into the transmission case including mounting the main drive gear on the forward end of the main shaft, the main drive gear having a diameter larger than the input shaft bearing receiving bore; inserting the main shaft through the open upper end of the transmission case in such manner that the rear end of the main shaft is loosely received in the bore provided in the transmission case for the main shaft rear bearing, which bore has a diameter which is smaller than at least one of the parts mounted on the main shaft; introducing the input shaft through the bore provided in the transmission case for the input shaft bearing; rotatably connecting the forward end of the main shaft with the rear end of the input shaft; transferring the main drive gear from the forward end of the main shaft onto the rear end of the input shaft; inserting the input shaft bearing and the main shaft rear bearing into their respective bores and at the same time placing these bearings around the respective shafts; and inserting the front and rear countershaft bearings into their respective bores and at the same time placing these bearings around the front and rear ends, respectively, of the countershaft.

2. A method of assembling the parts contained in the case of a synchromesh transmission of the type which is arranged to transmit power in both a forward and a reverse direction and in which the main drive gear is axially shiftable for mounting on and for movement off the rear end of the input shaft and wherein the case has an open upper end, a pair of coaxially aligned bores for receiving front and rear countershaft bearings, a pair of coaxially aligned bores for receiving input shaft and main shaft bearings, respectively, and a control cover for closing the upper end, said method comprising the steps of inserting and mounting the reverse gear in the bottom portion of the transmission case; assembling the countershaft with all parts normally mounted thereon prior to insertion of the countershaft into the transmission case; inserting the countershaft through the open upper end of the transmission case in such a way that the ends of the countershaft are loosely received in the bores provided in the transmission case for the front and rear countershaft bearings, at least one of the parts mounted on the countershaft having a diameter larger than either of the bores; assembling the main shaft with all parts normally mounted thereon prior to insertion of the main shaft into the transmission case including mounting the main drive gear on the forward end of the main shaft, the main drive gear having a diameter larger than the input shaft bearing receiving bore; inserting the main shaft through the open upper end of the transmission case in such manner that the rear end of the main shaft is loosely received in the bore provided in the transmission case for the main shaft rear bearing, which bore has a diameter which is smaller than at least one of the parts mounted on the main shaft; introducing the input shaft through the bore provided in the transmission case for the input shaft bearing; rotatably connecting the forward end of the main shaft with the rear end of the input shaft; transferring the main drive gear from the forward end of the main shaft onto the rear end of the input shaft; inserting the input shaft bearing and the main shaft rear bearing into their respective bores and at the same time placing these bearings around the respective shafts; inserting the front and rear countershaft bearings into their respective bores and at the same time placing these bearings around the front and rear ends, respectively, of the countershaft; and connecting the control cover with the open end of the transmission case.

3. A method of assembling the parts contained in the case of a synchromesh transmission of the type in which the main drive gear is axially shiftable for mounting on the rear end of the input shaft and wherein the case has an open upper end, a pair of coaxially aligned bores for receiving front and rear countershaft bearings, and a pair of coaxially aligned bores for receiving input shaft and main shaft bearings, respectively, said method comprising assembling the countershaft with the parts normally mounted thereon prior to insertion of the countershaft into the transmission case; inserting the countershaft through the open upper end of the transmission case and inserting the ends of the countershaft into the bores provided in the transmission case for the countershaft bearings, at least one of the parts mounted on the countershaft having a diameter larger than either of the bores; assembling the main shaft with the parts normally mounted thereon prior to insertion of the main shaft into the transmission case including mounting the main drive gear at the forward end of the main shaft, the main drive gear having a diameter larger than the input shaft bearing receiving bore; inserting the main shaft through the open upper end of the transmission case and inserting the rear end of the main shaft into the bore provided in the transmission case for the main shaft bearing, which bore has a diameter which is smaller than at least one of the parts mounted on the main shaft; introducing the input shaft through the bore provided in the transmission case for the input shaft bearing; transferring the main drive gear onto the rear end of the input shaft; inserting the input shaft and the main shaft bearings into their respective bores and at the same time placing these bearings around the respective shafts; and inserting the countershaft bearings into their respective bores and at the same time placing these bearings around the countershaft.

4. A method of assembling the parts contained in the case of a four-speed synchromesh transmission of the type in which the main drive gear is axially shiftable for mounting on the rear end of the input shaft and wherein the case has an open upper end, a pair of coaxially aligned bores for receiving front and rear countershaft bearings, and a pair of coaxially aligned bores for receiving input shaft and main shaft bearings, respectively, said method comprising assembling the countershaft with the parts normally mounted thereon prior to insertion of the countershaft into the transmission case; inserting the countershaft through the open upper end of the transmission case and inserting the ends of the countershaft into the bores provided in the transmission case for the countershaft bearings, at least one of the parts mounted on the countershaft having a diameter larger than either of the bores; assembling the main shaft with the parts normally mounted thereon prior to insertion of the main shaft into the transmission case including mounting the main drive gear at the forward end of the main shaft, the main drive gear having a diameter larger than the input shaft bearing receiving bore; inserting the main shaft through the open upper end of the transmission case and inserting the rear end of the main shaft into the bore provided in the transmission case for the main shaft bearing, which bore has a diameter which is smaller than at least one of the parts mounted on the main shaft; introducing the input shaft through the bore provided in the transmission case for the input shaft bearing; transferring the main drive gear onto the rear end of the input shaft and connecting the rear end of the input shaft with the forward end of the main shaft; inserting the input shaft and the main shaft bearings into their respective bores and at the same time placing these bearings around the respective shafts; and inserting the countershaft bearings into their respective bores and at the same time placing these bearings around the countershaft.

5. A method of assembling the parts contained in the case of a synchromesh transmission of the type which is arranged to transmit power in both a forward and a reverse direction and in which the main drive gear is axially shiftable for mounting on the rear end of the input shaft and wherein the case has an open upper end, a pair of coaxially aligned bores for receiving front and rear countershaft bearings, a pair of coaxially aligned bore for receiving input shaft and main shaft bearings, respectively, and a rear cap and a control cover for closing the rear end and the upper end of the case, respectively, said method comprising inserting and mounting the reverse gear in the bottom part of the transmission case; assembling the countershaft with the parts normally mounted thereon prior to insertion of the countershaft into the transmission case; inserting the countershaft through the open upper end of the transmission case and inserting the ends of the countershaft into the bores provided in the transmission case for the countershaft bearings, at least one of the parts mounted on the countershaft having a diameter larger than either of the bores; assembling the main shaft with the parts normally mounted thereon prior to insertion of the main shaft into the transmission case including mounting the main drive gear at the forward end of the main shaft, the main drive gear having a diameter larger than the input shaft bearing receiving bore; inserting the main shaft through the open upper end of the transmission case and inserting the rear end of the main shaft into the bore provided in the transmission case for the main shaft bearing, which bore has a diameter which is smaller than at least one of the parts mounted on the main shaft; introducing the input shaft through the bore provided in the transmission case for the input shaft bearing; transferring the main drive gear onto the rear end of the input shaft; inserting the input shaft and the main shaft bearings into their respective bores and at the same time placing these bearings around the respective shafts; inserting the countershaft bearings into their respective bores and at the same time placing these bearings around the countershaft; connecting the rear cap to the transmission case; and connecting the control cover to the open upper end of the transmission case.

6. A method of assembling the parts contained in the case of a synchromesh transmission of the type in which a synchromesh clutch component is axially shiftable for mounting on the rear end of the input shaft and wherein the case has an open upper end, a pair of coaxially aligned bores for receiving front and rear countershaft bearings, and a pair of coaxially aligned bores for receiving input shaft and main shaft bearings, respectively, said method comprising assembling the countershaft with the parts normally mounted thereon prior to insertion of the countershaft into the transmission case; inserting the countershaft through the open upper end of the transmission case and inserting the ends of the countershaft into the bores provided in the transmission case for the countershaft bearings, at least one of the parts mounted on the countershaft having a diameter larger than either of the bores; assembling the main shaft with the parts normally mounted thereon prior to insertion of the main shaft into the transmission case including mounting the clutch component at the forward end of the main shaft, the clutch component having a diameter larger than the input shaft bearing receiving bore; inserting the main shaft through the open upper end of the transmission case and inserting the rear end of the main shaft into the bore provided in the transmission case for the main shaft bearing, which bore has a diameter which is smaller than at least one of the parts mounted on the main shaft; introducing the input shaft through the bore prvided in the transmission case for the input shaft bearing; transferring the clutch component onto the rear end of the input shaft; inserting the input shaft and the main shaft bearings into their respective bores and at the same time placing these bearings around the respective shafts; and inserting the countershaft bearings into their respective bores and at the same time placing these bearings around the countershaft.

References Cited by the Examiner
UNITED STATES PATENTS

| | | | |
|---|---|---|---|
| 1,463,269 | 7/23 | Johnson | 29—464 |
| 1,537,828 | 5/25 | Jones. | |
| 2,709,923 | 6/55 | Manning | 29—469 X |
| 2,753,728 | 7/56 | Kelbel | 73—333 X |
| 2,845,696 | 8/58 | De Bourgues | 29—469 X |

WHITMORE A. WILTZ, *Primary Examiner*.